June 30, 1925.  1,544,122
G. P. BARCLAY
ICE CREAM FILLING MACHINE
Filed Oct. 9, 1923  2 Sheets-Sheet 1
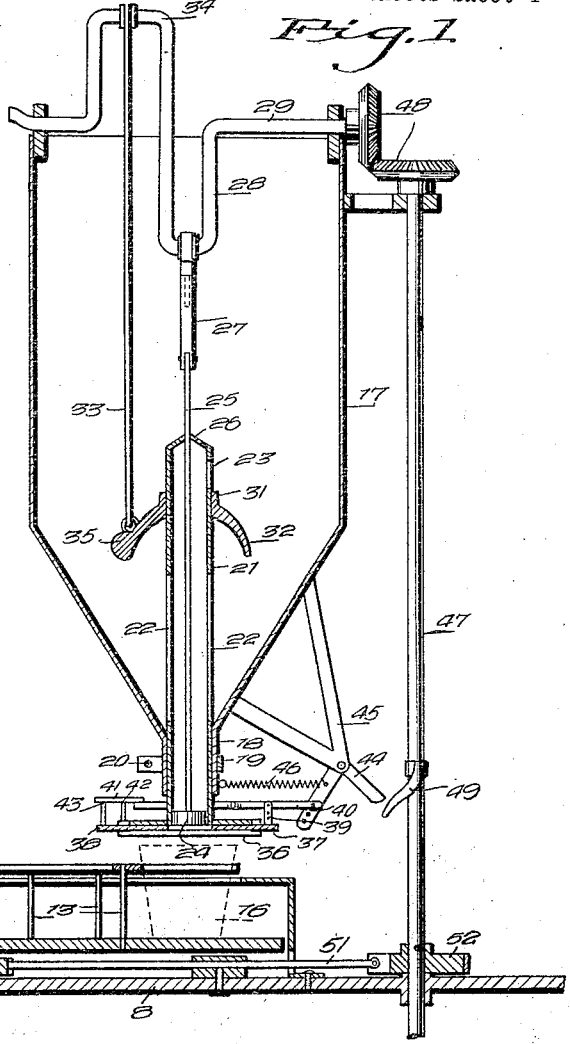
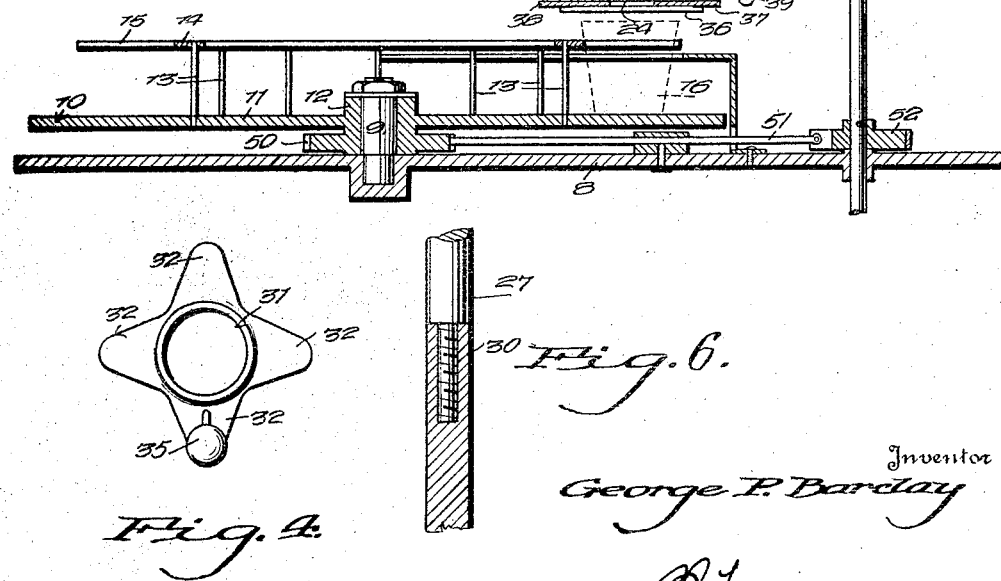
Inventor
George P. Barclay
By
Attorney Patented June 30, 1925.

1,544,122

UNITED STATES PATENT OFFICE.

GEORGE P. BARCLAY, OF UNIONTOWN, PENNSYLVANIA.

ICE-CREAM-FILLING MACHINE.

Application filed October 9, 1923. Serial No. 667,547.

*To all whom it may concern:*

Be it known that I, GEORGE P. BARCLAY, a citizen of the United States, residing at Uniontown, in the county of Fayette and State of Pennsylvania, have invented certain new and useful Improvements in Ice-Cream-Filling Machines, of which the following is a specification.

The present invention relates to apparatus particularly intended for depositing ice cream or similar substances in individual containers, and the object is to provide apparatus for this purpose, which is simple, effective, and is capable of depositing predetermined amounts successively and rapidly in the containers.

An embodiment of the invention that has proven highly efficient and is at present considered the preferable construction is disclosed in the accompanying drawings, wherein:—

Figure 1 is a vertical longitudinal sectional view therethrough,

Figure 4 is a plan view of the feeding device, Figure 5 is a detail view of the trip for actuating the cut-off, Figure 6 is a detail sectional view showing the adjustable connection between the extensible sections of the plunger operating pitman.

Figure 2:
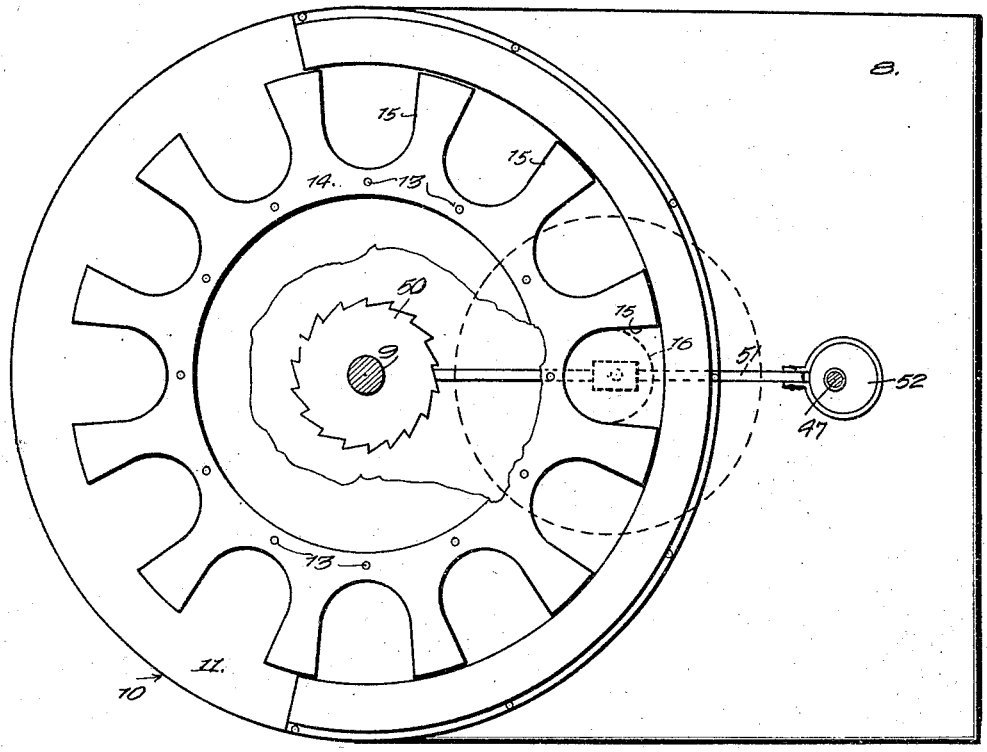
Figure 2 is a plan view of the cup-carrying table and indicating the operating mechanism.
Figure 3:
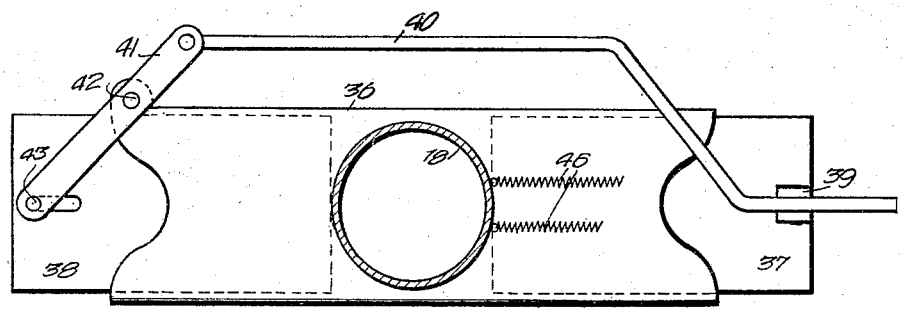
Figure 3 is a top plan view of the cut-off means.

A suitably supported platform or table 8 is provided, carrying an upright post 9, on which is journaled a rotatable cup-carrying table 10. This table consists of a base 11 having a hub 12 rotatably mounted on the post 9, and said base has standards 13 supporting a recessed ring 14. The recesses 15 of said ring constitute seats for the cups 16 to be filled.

Suitably supported above the cup-carrying table 10 at one side of its axis of rotation and centrally above the path of the seats 15, is a container or reservoir 17 in the form of a hopper that terminates in a depending contractile collar 18, said collar being surrounded by a split clamping ring 19, the ends of which are connected by a tension bolt 20. In this collar is clamped a vertical cylinder 21 that projects below the collar and also extends upwardly into the container hopper 17. It is provided in its lower portion with one or more vertical inlet openings 22 communicating with the interior of the lower portion of the container. It is also provided in its upper portion with a vent opening 23. The lower end of the cylinder 21 is open.

An expelling plunger 24 is mounted to reciprocate in the cylinder and moves across the inlet openings 22. It is provided with a stem 25 slidably engaged in the top 26 of the cylinder, and its upper end projecting above said cylinder, is connected by a pitman 27 with the crank 28 of a crank shaft 29 journaled on the top of the container 17. The pitman 27 is preferably in sections adjustably screwed together, as shown at 30, so that said pitman may be extended or contracted to vary the path of the plunger 24, and thus alter the amount of material expelled thereby. Located within the container 17 outside the cylinder 21 is a feeding device, which preferably takes the form of a spider having a central collar 31 that reciprocates on the said cylinder, the collar being provided with outstanding blades 32 that thus move up and down between the cylinder and the walls of the container 17. This spider is connected by a pitman 33 with a crank 34 of the crank shaft 29, so that the plunger 24 and spider operate simultaneously in opposite directions. The pitman 33 is connected to the spider at one side of the collar 31 and the corresponding finger or blade 32 is preferably weighted as shown at 35 so as to balance the parts and insure the easy movement of the spider on the cylinder without binding.

The lower end of the cylinder carries a transversely disposed horizontal guideway 36 extending on opposite sides of its open lower end. Oppositely reciprocating cut-off blades 37—38 are located in this guideway and are adapted to move simultaneously towards and from each other to close and open the said end of the cylinder. The blade 37 has an upstanding post 39 to which is adjustably pivoted a link 40 that extends around the cylinder and has its rear end pivotally engaged with a lever 41. This lever is fulcrumed between its ends, as shown at 42 on the guideway 36, and has a pivotal connection 43 with the outer end of the blade 38. As a consequence the blades are caused to move simultaneously in opposite directions. The link 40 has its outer end adjustably connected to one arm of a bell crank 44 mounted on a bracket 45 secured to the container. Springs 46, connected to the spout of the container 17 and to the bell crank, serve to move the parts so as to urge the blades to their inner or closed position across the lower end of the cylinder 21.

A vertical drive shaft 47 extends through the table and is driven from any suitable source of power, as a motor beneath the table. It is geared, as shown at 48, to the crank shaft 29 and is also provided with a trip 49 that strikes the free arm of the bell crank 44 so as to swing said bell crank outwardly, thereby moving the link 40 and swinging the blades 37—38 against the action of the spring 46. When the said trip disengages the bell crank, the springs 46 react to close the cut-off blades.

The hub 12 of the cup-carrying table 10 is provided beneath said table with a ratchet wheel 50, and the teeth thereof are adapted to be engaged by a pawl 51 suitably supported on the table and operated by a cam 52 on the drive shaft 47. The path of this pawl is such that it will engage successively a tooth of the ratchet wheel 50 and cause the table to be turned sufficiently to present the cups in the seats 15 successively beneath the cylinder 21.

The operation of the apparatus is as follows: While the plunger 24 is being elevated, the cut-off blades 37 and 38 are in their closed positions and the feeding spider 31—32 is moving downwardly. At the same time the table 10 is rotated, to present a cup beneath the cylinder. As the lower end of the plunger 24 rises above the bottoms of the openings 22 ice cream in the container will flow or be forced into the lower end of the cylinder. As the plunger begins to descend, the cut-off blades 37—38 are opened and the ice cream within the lower end of the cylinder is expelled by the plunger into the cup beneath. When the expulsion has been completed the plunger 24 again begins its ascent, the blades 37—38 reclose and the filled cup is moved from beneath the cylinder, while an empty cup is brought to a position to be filled and the operation is repeated.

Obviously the position of the cylinder 21 can be altered by elevating or lowering said cylinder and the path of the plunger can be changed by extending or contracting the pitman 27. Other cylinders may be also placed in position, having different bores and openings, so that the amount of material discharged can be easily varied.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:—

1. A filling machine of the character set forth comprising a container, a cylinder therein having an outlet and an inlet in one side within the container, an expelling plunger operating in the cylinder across the inlet, and a feeding device surrounding the cylinder and mounted to reciprocate on the cylinder and operating in the container outside said cylinder.

2. A filling machine of the character set forth, comprising a container hopper, a cylinder mounted in the bottom thereof and projecting upwardly within the hopper, said cylinder having a lateral inlet opening in the hopper, a reciprocatory expelling plunger in the cylinder operating across the inlet, a reciprocatory feeding spider surrounding and slidably mounted on the exterior of the cylinder, and means for reciprocating the plunger and spider simultaneously in opposite directions.

3. A filling machine of the character set forth, comprising a container hopper having a contractile collar at its bottom and means for contracting said collar, a cylinder adjustably mounted on the collar and detachably clamped in and by said collar and projecting upwardly within the hopper, said cylinder having a lateral inlet opening in the hopper, a reciprocatory expelling plunger in the cylinder operating across the container, a reciprocatory feeding spider slidably mounted on the exterior of the cylinder, within the container, and means for reciprocating the plunger and spider simultaneously in opposite directions.

4. In a filling machine of the character set forth, the combination with a container, of a cylinder therein having a lower discharge end, an expelling plunger operating in the cylinder, a crank shaft above the container connected to the plunger, a guideway located transversely of the lower end of the cylinder and extending on opposite sides thereof, cutoff blades operating in the guideway to and from positions to close the lower end of the cylinder, connections between the blades to cause their simultaneous movements in opposite directions, a spring for urging the blades towards each other, an upright drive shaft geared to the crank shaft and having a trip, and means actuated by the trip for moving the blades to open position.

5. In a filling machine of the character set forth, the combination with a container, of a cylinder in the container having a bottom discharge, and expelling plunger in the cylinder, a crank shaft operating the plunger, a vertical drive shaft alongside the container for driving the crank shaft, a receiver-carrying table operating beneath the container and cylinder, and means operated by the drive shaft for effecting a step-by-step movement of the table.

6. In a filling machine of the character set forth, the combination with a container, of a cylinder in the container having a bottom discharge, an expelling plunger in the cylinder, a crank shaft operating the plunger, a vertical drive shaft alongside the container for driving the crank shaft, a receiver carrying table operating beneath the container and cylinder, a ratchet wheel on the table, and a pawl operated by the vertical drive shaft and operating on the ratchet wheel to effect a step-by-step rotation of the table.

7. In a filling machine of the character set forth, the combination with a rotatable receiver-carrying table, of a hopper located thereover at one side of its axis of rotation, a vertical cylinder in the hopper having a lower discharge end and a lateral intake opening in the hopper, an expelling plunger operating in the cylinder across the opening, a feeding spider reciprocally mounted on the cylinder and operating in the hopper, a shaft across the hopper having oppositely disposed cranks connected to the plunger and spider, a vertical drive shaft alongside the hopper, ratchet teeth on the table, a pawl operating on the ratchet teeth and actuated by the drive shaft, oppositely operating cut-off blades at the discharge end of the cylinder, and means actuated by the drive shaft for simultaneously moving the plungers in opposite directions.

8. In a filling machine, the combination with a container, of a cylinder extending upwardly thereinto in spaced relation to the walls thereof and having an intake opening, means within the cylinder for ejecting the contents thereof, and a feeder movably mounted on the portion of the cylinder within the container and operating in the space between the walls of the cylinder and the walls of the container.

9. In a filling machine, the combination with a container, of a cylinder extending upwardly thereinto in spaced relation to the walls thereof and having an intake opening, means within the cylinder for ejecting the contents thereof, and a feeder comprising a collar that surrounds and reciprocates on the portion of the cylinder within the container, said collar having feeding means operating in the space between the walls of the cylinder and the walls of the container.

10. In a filling machine, the combination with a container, of a cylinder extending upwardly thereinto in spaced relation to the walls thereof and having an intake opening, means within the cylinder for ejecting the contents thereof, and a feeder comprising a collar that surrounds and reciprocates on the portion of the cylinder within the container, said collar having outstanding spider arms that operate in the space between the walls of the cylinder and the walls of the container.

11. In a filling machine, the combination with a container, of a cylinder extending upwardly thereinto, a shaft across the container having oppositely disposed cranks, a piston in the cylinder connected to one crank, and a feeder mounted to reciprocate on the cylinder and connected to the other crank.

12. In a filling machine, the combination with a container, of a cylinder extending upwardly therein and having an inlet in the container, means for holding the cylinder at different elevations in the container, an expelling plunger in the cylinder, and means for reciprocating the plunger.

13. In a filling machine, the combination with a container, of a cylinder extending upwardly therein and having an inlet in the container, means for holding the cylinder at different elevations in the container, an expelling plunger in the cylinder, a rotatable crank arm, and an extensible connection between the crank arm and plunger.

In testimony whereof, I affix my signature.

. GEORGE P. BARCLAY.